United States Patent [19]
Parlevliet

[11] 3,784,266
[45] Jan. 8, 1974

[54] PIVOTED, SEGMENTAL, THRUST BEARING PROVIDING SIMULATED OFFSET SUPPORT OF CENTRALLY SUPPORTED BEARING SEGMENTS

[75] Inventor: Theodor Parlevliet, Berlin, Germany
[73] Assignee: Siemens Aktiengesellschaft, Munich, Germany
[22] Filed: Mar. 1, 1973
[21] Appl. No.: 337,013

[30] Foreign Application Priority Data
Mar. 6, 1972 Germany.................. P 22 11 414.3

[52] U.S. Cl. ............................................... 308/160
[51] Int. Cl. .......................................... F16c 17/06
[58] Field of Search....................... 308/160, 73, 168

[56] References Cited
UNITED STATES PATENTS
1,900,924  3/1933  Firth ................................. 308/160

Primary Examiner—Charles J. Myhre
Assistant Examiner—Frank Susko
Attorney—Hugh A. Chapin

[57] ABSTRACT

In a hydrodynamic pivoted segmental thrust bearing, a centrally supported, pivoted bearing segment including at least one elongated lubricating fluid collection groove disposed in the bearing surface of the segment adjacent and parallel to at least one of the radial edges thereof, and at least one fluid outlet aperture disposed through the segment opening at one end into the groove and at the other end into the thrust bearing well of the bearing. The collection groove drains fluid from the bearing surface into the bearing well, and interrupts the formation of the bearing surface lubricating fluid film, thereby reducing the effective bearing surface on one side of the segment. A simulated offset support of centrally supported segments is thus achieved.

4 Claims, 5 Drawing Figures

PIVOTED, SEGMENTAL, THRUST BEARING PROVIDING SIMULATED OFFSET SUPPORT OF CENTRALLY SUPPORTED BEARING SEGMENTS

BACKGROUND OF THE INVENTION

1. Field of the Invention

The invention relates generally to thrust bearings, and, in particular, to centrally supported pivoted, segmental, thrust bearing shoes having controlled lubricating fluid collection grooves on the bearing surfaces thereof for forming a film of lubricating fluid on the bearing surface of each segment which reduces frictional losses during rotation of the bearing collar.

2. Description of the Prior Art

Pivoted segmental thrust bearings are generally used to support vertically disposed shafts and to prevent axial movement of horizontally disposed shafts. The bearing members of such thrust bearings comprise tiltable segments, or shoes, which are pivotably disposed on rigid support members, such as hard steel buttons, mounted on the housing of the thrust bearing. The bearing surfaces of the segments support a thrust collar which is coupled to the shaft to be supported. The segments and the thrust collar are disposed in a thrust bearing well which is filled with a lubricating fluid, such as oil. When the thrust collar of the bearing is rotated by movement of the shaft to which it is connected, a film of lubricating fluid is formed between the bearing surfaces of the segments and the thrust collar, which film supports the thrust collar between the segments and collar during rotation thereof. Each of the segments is tilted on its support member by the collar rotation so that a wedge-shaped film of lubricating fluid, which decreases in thickness in the direction of rotation of the thrust collar, is formed.

In all such hydrodynamic thrust bearings, the segments have generally been supported at their longitudinal centers, a construction which produces unsatisfactory frictional losses. As a result, thrust bearing construction has been modified so that the lubricating fluid on the bearing surfaces of the segments is formed into a better wedge shape which significantly reduces frictional losses. The support member of each segment may, for example, base displaced from the longitudinal center thereof in the direction of rotation of the thrust collar of the bearing. This construction significantly reduces frictional losses both during initial movement of the thrust collar during starting and during operation, but only when the thrust collar is rotated in one direction, the direction in which the support members are displaced. Significant friction losses result where the thrust collar is rotated in the opposite direction. If the thrust bearing collar is to be rotated in both directions, such as when such a thrust bearing is used in a turbine pump, a unidirectional offset supported thrust bearing segment must be further modified to reduce frictional losses. This has been achieved by providing a pressurized lubricating fluid supply outlet on the bearing support surface of each segment between the offset supporting members and the edge of each segment which is disposed closest to the support member. The oil is pumped out of the outlet just prior to initial movement of the thrust collar during starting and during the operation of the bearing, between the segments and collar at a pressure sufficient to create a rotational force of such magnitude that each segment is tilted with respect to the thrust collar into a position which forms the desired lubricating film shape on the bearing surfaces of the segments. Such a thrust bearing is disclosed in German Pat. No. 1,286,342. This bearing, however, is expensive to manufacture, since a pressurized oil source is required, and it is only designed for use where rotation in the second direction is to take place for short periods of time. Centrally supported segmental thrust bearings which have been modified for two directional rotation are also known. In these bearings, the radial edges of the segments are bevelled to reduce frictional losses. Such centrally supported segments, however, produce considerably higher frictional losses than offset supported segments, and the reliability of such bearings is, as a result, significantly reduced.

SUMMARY OF THE INVENTION

It is therefore an object of the invention to provide a hydrodynamic pivoted, segmental thrust bearing having centrally supported bearing segments whose frictional losses during operation of the bearing in one or two directions of rotation are similar to those of offset supported pivoted segmental thrust bearings.

According to the invention, each bearing segment of a centrally supported, pivoted, segmental thrust bearing is provided with at least one elongated lubrication fluid collection groove disposed on the segment bearing surfaces adjacent and parallel to at least one of the radial edges thereof. At least one lubrication fluid outlet aperture extends through each bearing segment and opens into the groove for draining collected lubricating fluid therefrom. During operation of the thrust bearing, when the thrust bearing collar is rotated in a direction corresponding to the displacement of the groove with respect to the center of the segment, lubricating fluid is collected in the groove and is drained therefrom into the thrust bearing well by the fluid outlet of each segment. The formation of a fluid film on the bearing surfaces of the segments is thus interrupted, and the bearing surface adjacent each groove is effectively reduced, causing each segment to tilt with respect to the thrust bearing collar, and form a film of lubricating fluid on the bearing surfaces of the segments in an improved wedge shape which produces minimal frictional losses during rotation of the thrust collar. The effect is to provide simulated offset segment support of centrally supported bearing segments.

BRIEF DESCRIPTION OF DRAWINGS

In the drawings, similar reference numerals are used to denote similar elements throughout the several views.

DETAILED DESCRIPTION

Figure 1:
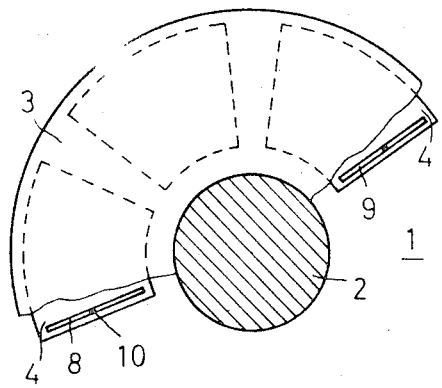
FIG. 1 is a partial plan view of a centrally supported, pivoted, segmental thrust bearing constructed according to the invention, showing a shaft coupled to the bearing in section.

In accordance with the invention, the solution of the problem described above comprises providing each centrally supported bearing segment of a pivoted, segmental thrust bearing with at least one elongated lubricating fluid collection groove disposed adjacent and extending parallel to at least one radial edge of each segment on the bearing surfaces thereof. At least one lubricating fluid outlet aperture is disposed through each segment and opens into each groove, for draining lubricating fluid therefrom. During operation of the thrust bearing, when the thrust bearing collar is rotated in a direction corresponding to the direction of displacement of each groove with respect to the center of the bearing segments, lubricating fluid collects in the grooves and is drained therefrom by the fluid outlet in each segment. For two directional rotation, a second groove is provided in each bearing segment surface adjacent and parallel to the other radial edge thereof, and an additional fluid outlet aperture opening into the second groove, is provided in each segment for draining lubricating fluid from the second groove into the bearing well. Valve means, coupled to the fluid outlets in each segment, control the drain of fluid therefrom so that during operation of the thrust bearing, collected lubricating fluid is drained only from the groove of each bearing segment which is displaced towards the direction of rotation of the thrust bearing collar with respect to the center of each segment. The valve means prevents drainage of collected lubricating fluid from the groove at the other end of each segment. The fluid drained from the groove in each segment interrupts the lubricating fluid film formed on the bearing surface of each segment and effectively simulates offset support of each centrally supported segment towards the direction of rotation of the thrust collar of the bearing. As a result, the bearing surface on one side of each segment is effectively reduced, and a turning movement is produced which tilts each segment upwardly towards the thrust bearing collar at the end from which fluid is drained. The film of lubricating fluid on the surface of each segment is thus formed in a wedge shape, decreasing in thickness towards the direction of rotation of the thrust bearing collar as if each of the segments were supported by an offset supporting member, instead of at their centers. When the direction of rotation of the thrust collar is changed, the valve means reverse the flow, while the bearing is stationary, so that the lubricating fluid is dispensed only from the groove disposed at the opposite radial edge of each segment, in the direction of rotation of the thrust collar with respect to the center of each segment. By simulating offset support of centrally supported bearing segments, low frictional losses, and high reliability, equivalent to those of offset supported segmental thrust bearings, are obtained from a thrust bearing having centrally supported segments, a result heretofore impossible to achieve using known centrally supported bearing segments.

If lubricating fluid is supplied under pressure to the thrust bearing of the invention while the thrust collar thereof is stationary, and such fluid is fed to a centrally disposed dispersion pocket on the surface of each segment, the invention provides the further advantage that each segment is positioned, before rotation, with respect to the thrust bearing collar, in a position similar to that which each segment assumes during rotation of the thrust collar, thereby forming prior to rotation, a wedge of lubricating fluid on the bearing surfaces of the segments similar to the film formed during rotation, which significantly reduces friction losses during starting. This positioning of the segments prior to rotation is caused by the fluid pressure supplied to the dispersion pocket. A rotational force acts upon the bearing segments as the fluid flows between the segments since the discharge path from the pocket to the groove from which the fluid is drained is shorter than the discharge path past the opposite edge of each segment where fluid drainage is prevented. The centrally supported segments of the thrust bearing assume an equilibrium position when the width of the gap between the thrust collar and segments through which the fluid flows at the end of each segment from which fluid is drained is less than that at the other end of the segment. When this equilibrium position is reached, a wedge-shaped film of lubricating fluid is formed on the bearing surface prior to initial movement of the thrust collar, thus significantly reducing friction losses during starting.

The lubricating fluid outlet apertures may be formed by simply drilling a hole through each segment into the collecting grooves. The valve means is then coupled to each of the outlets in the segments. In order to conserve space in the thrust bearing housing, and to reduce fabrication expense, it is preferable to couple those fluid outlets which are coupled to grooves disposed at corresponding edges of each segment to a common valve.

It is to be understood that the embodiment of the invention illustrated in the accompanying drawings and described in the following description is by way of example only, and it is not intended that the drawings and detailed description comprise a definition of the limits and scope of the invention disclosed herein.

Figure 2:
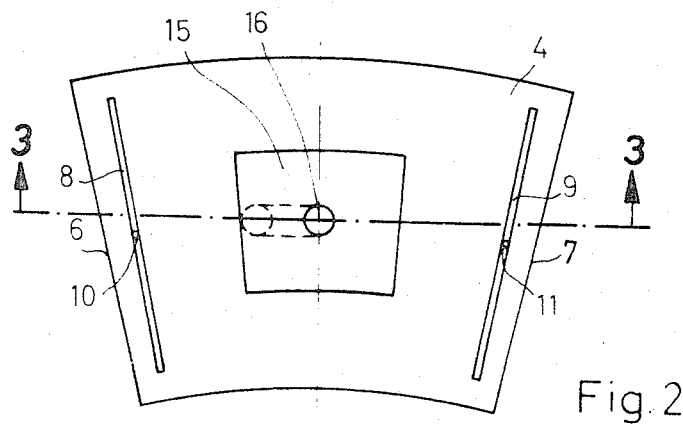
FIG. 2 is a plan view of a bearing segment of the thrust bearing constructed according to the invention.
Figure 3:
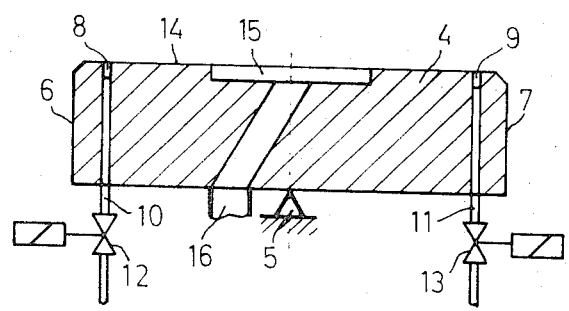
FIG. 3 is a sectional side view of the bearing segment taken along section 3—3 of FIG. 2.

Referring now to the drawings, specifically FIGS. 1–3, there is shown a hydrodynamic pivoted, segmental thrust bearing 1 including a rotatable thrust collar 3 which is coupled to a rotatable shaft 2 supported by the bearing. Pivoted segments, or shoes, 4 are disposed adjacent collar 3 in an annular arrangement. Each of segments 4 is pivotably disposed on rigid supporting members 5 at the center of each segment. Members 5 are indicated schematically, and may comprise, for example, steel pins affixed to the thrust bearing housing.

As illustrated in detail in FIGS. 2 and 3, each of segments 4 is provided with a pair of elongated lubrication fluid collection grooves 8 and 9 which are disposed adjacent and parallel to radial edges 6 and 7 of each segment on the bearing surfaces thereof. First and second fluid outlet apertures 10 and 11, which may, for example, comprise cylindrical bores, are disposed through each of segments 4 and open into grooves 8 and 9. Valve means, illustrated as first and second valves 12 and 13 coupled to outlets 10 and 11, control the flow of the lubricating fluid from the bearing surface of the segments into grooves 8 and 9, outlets 10 and 11, and the thrust bearing well. Valves 12 and 13 may be any suitable known manually or electrically operated fluid control valves. Electrically operated valves, are, however, preferable. A lubricating fluid dispersion pocket 15 is provided in the center of the bearing surface of each segment, for dispersing lubricating fluid supplied thereto under pressure by fluid feedline 16, which is coupled to a fluid pressure source (not shown), such as a fluid pump.

Figure 4:
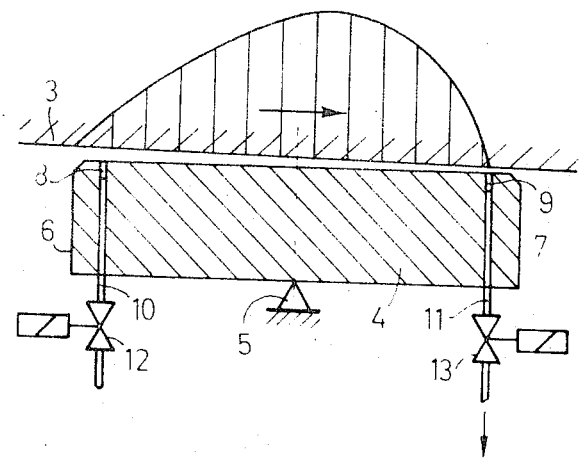
FIG. 4 is a sectional side view of a bearing segment constructed according to the invention, showing the position of the segment during operation of the thrust bearing collar in one direction of rotation including a graphical illustration of the lubricating fluid pressure distribution over the bearing surface of the segment during rotation of the thrust collar.

The operation of the thrust bearing will now be described with reference to FIGS. 4 and 5:

While the thrust bearing collar is at rest, before rotation thereof in either direction, the valve coupled to the groove at the leading edge of each segment, i.e., the valve coupled to the groove which is displaced from the segment center in a direction opposite the direction in which the collar is to be rotated, is closed to prevent fluid drainage from the groove at the leading edge, and the valve coupled to the groove at the trailing edge of each segment, i.e., the valve coupled to the groove which is displaced from the segment center in the direction of the intended collar rotation, is opened to permit drainage of collected fluid from the groove at the trailing edge. For example, with respect to the direction of collar rotation indicated in FIG. 4, groove 8 is located at the leading edge of the segment 4, and groove 9 is located at the trailing edge thereof. Prior to rotation of the collar, valve 13 is thus opened and valve 12 closed. Lubricating fluid, such as oil, is then admitted by pressure feed line 16 to dispersion pocket 15 (not illustrated in FIG. 4). The fluid flows over the bearing surface of the segment towards both of its radial edges. At the leading edge of the segment the fluid flows over the end of the segment into the thrust bearing well; at the trailing edge, the fluid collects in groove 9 and flows therefrom through outlet 11 and valve 13 into the thrust bearing well. Since the effective bearing surface is reduced on one side of the segment, due to the fact that the flow path from pocket 15 to groove 9 is shorter than the flow path over the leading edge of the segment, a rotational force is produced which acts on segments 4 about support members 5 and pivots the segments towards collar 3 at the trailing edges thereof. The lubricating gap between the segments and the thrust collar becomes narrower at the trailing edge than at the leading edge, and a wedge-shaped film of lubricating fluid having an improved shape is formed on the bearing surfaces prior to rotation.

When collar 3 is rotated, the operation is essentially the same. The film of lubricating fluid formed by the fluid in the thrust bearing well is interrupted by groove 9 at the trailing edge of segment 4, and a rotational force acting on the segment pivots the segments until they reach an equilibrium position, as described above. The pressure distribution of the film of lubricating fluid on the bearing surface of segment 4 is graphically illustrated in FIG. 4. The graph shows how the bearing surface of the segment is reduced by the distance between the groove and trailing edge of segment 4.

Figure 5:
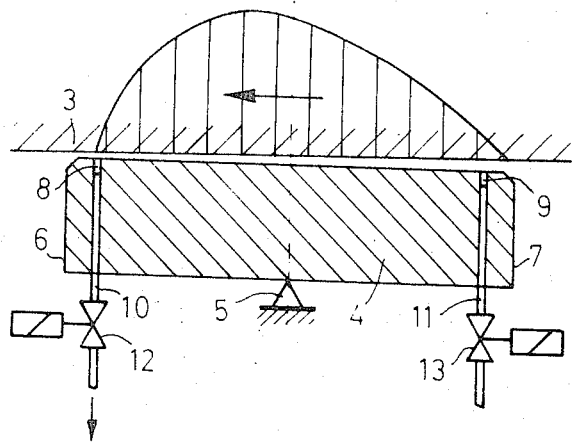
FIG. 5 is another sectional side view of the bearing segment of FIG. 4, showing the position of the bearing segment during rotation of the thrust bearing collar in the opposite direction also including a graphical illustration of the lubricating fluid pressure distribution over the bearing surface of the segment during rotation of the thrust collar.

When the direction of rotation of collar 3 is to be reversed, in the direction of rotation indicated in FIG. 5, valve 12, which is now coupled to the groove at the trailing edge of the segment, is opened, and valve 13 is closed. While the collar is at rest, prior to rotation thereof, lubricating fluid is admitted to pocket 15. A wedge-shaped fluid film is thus formed on the segment bearing surfaces as described above. During rotation, operation of the bearing is the same as that described with respect to FIG. 4. The pressure distribution of the lubricating film for the opposite direction of rotation is also graphically illustrated by FIG. 5.

It should be noted that bearing segments 4 need not be provided with dispersion pocket 15, although such a construction is preferable since it reduces frictional losses during initial rotation of the thrust bearing collar. If the pockets are omitted, the wedge shaped fluid film is formed on the bearing segment surfaces as described during rotation of the thrust bearing collar. Also, as stated previously, it is preferable to utilize two valves which are coupled to grooves at corresponding edges of a plurality of bearing segments to control fluid drainage therefrom, rather than utilizing individual pairs of valves for each bearing segment. For the purposes of this disclosure, a film of lubricating fluid having an improved wedge shape is one which produces less frictional losses during rotation than a wedge-shaped film formed by known centrally supported bearing segments.

While there has been disclosed herein a preferred embodiment of the invention, it will be obvious to those skilled in the art that various changes and modifications may be made thereto without departing from the invention, and it is therefore intended in the appended claims to cover all such changes and modifications as fall within the true spirit and scope of the invention.

What is claimed is:

1. In a hydrodynamic, pivoted, segmental thrust bearing, having the segments and thrust collar thereoof disposed in a thrust bearing well filled with a lubricating fluid, a centrally supported, pivoted bearing segment including at least one elongated lubricating fluid collection groove disposed in the bearing surface of said segment adjacent and parallel to at least one of the radial edges thereof, and at least one first fluid outlet aperture disposed through said segment opening at one end into said groove and at the other end into the thrust bearing well, said segment being disposed in the bearing so that said groove is displaced with respect to the center of said segment in the direction of rotation of the thrust collar.

2. The bearing segment as recited in claim 1, further comprising a second elongated lubricating fluid collection groove, disposed in the bearing surface of said segment adjacent and parallel to the other radial edge thereof, a second fluid outlet aperture disposed through said segment opening at one end into said second elongated groove and at the other end into the thrust bearing well, and valve means, coupled to said apertures, for draining collected lubricating fluid into the thrust bearing well from the groove in said segment which is disposed with respect to the center thereof in the direction of rotation of the thrust collar.

3. The bearing segment as recited in claim 2, wherein said valve means comprises first and second fluid valves coupled to said first and second fluid outlet apertures, respectively.

4. The bearing segment as recited in claim 3 wherein said first and second fluid valves couple corresponding first and second fluid outlet apertures of a plurality of said bearing segments disposed in the thrust bearing.

* * * * *